No. 828,641. PATENTED AUG. 14, 1906.
I. CLIFFORD.
TIRE FOR MOTOR CARS.
APPLICATION FILED AUG. 4, 1905.
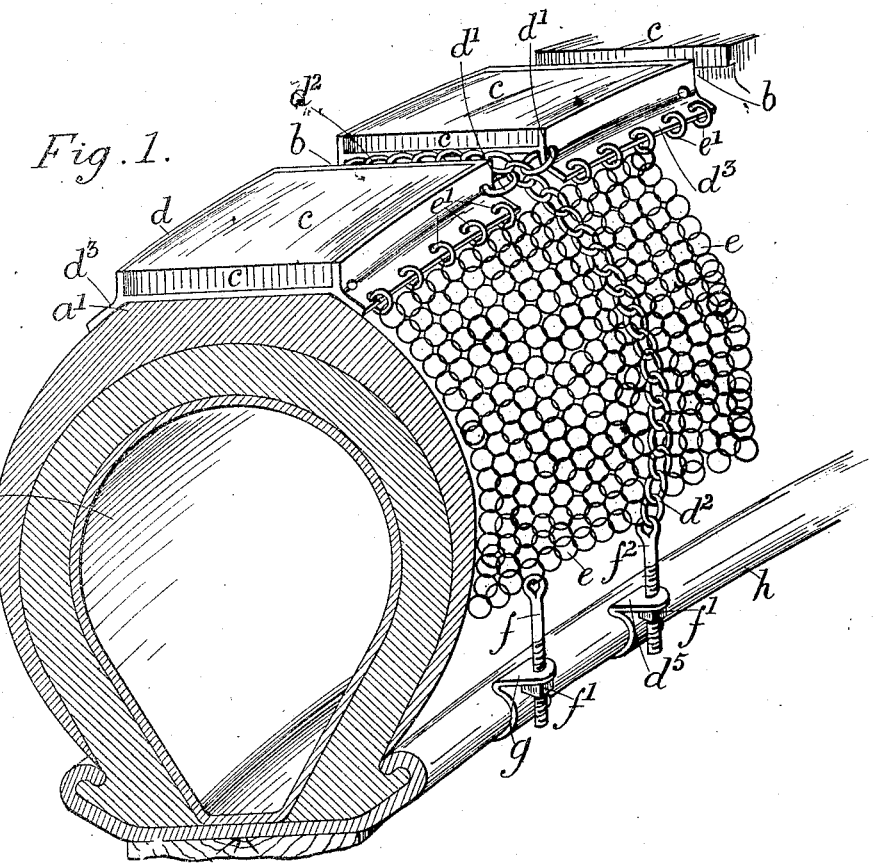
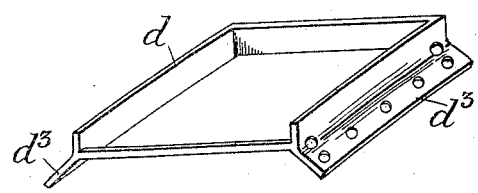
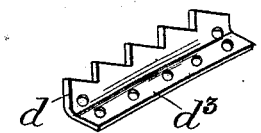
Witnesses
Inventor
Isidore Clifford

UNITED STATES PATENT OFFICE.

ISIDOR CLIFFORD, OF LONDON, ENGLAND.

TIRE FOR MOTOR-CARS.

No. 828,641.

Specification of Letters Patent.

Patented Aug. 14, 1906.

Application filed August 4, 1905. Serial No. 272,748.

*To all whom it may concern:*

Be it known that I, ISIDOR CLIFFORD, a subject of the King of Great Britain and Ireland, residing at London, England, have invented new and useful Improvements in Tires for Motor-Cars and other Vehicles, of which the following is a specification.

This invention relates more particularly to the rubber tires of motor-cars, although it is applicable to the tires of cycles and other road-vehicles; and its primary object is to prevent skidding or side slip of the wheels.

The said invention is further designed to provide means for reducing as far as possible puncturing and bursting of the tire, while at the same time operating to minimize wear of the same, also to act as a means for attaching the tire to the wheel-rim and, further, to prevent said tire from flying off, thereby avoiding dangerous accidents.

Many devices have from time to time been employed to prevent skidding or side slip, but so far they have been only partially successful, one objection being that while they are fairly reliable on road-surfaces of certain natures they are unreliable on road-surfaces of other natures, and, moreover, such devices have been found extremely destructive to the tires. Now my invention is designed to overcome these and other objections and to provide a tire which will prevent skidding or side slip and which can be used with equally good effect and reliability on all road-surfaces. To this end I form across the tread of the tire gaps, grooves, or recesses in such a manner as to divide up the tread into a number of blocks or protuberances, and around these latter I fit or apply suitably-shaped metal frames, plates, or strips to support and confine them, said frames or plates being provided with means whereby they are held firmly in position on the blocks or protuberances. These frames, plates, or strips are further attached to chain mail, metallic netting, or other suitable material, which extends over a portion or the whole of the sides of the tire, and said mail or netting is anchored to the wheel-rim (or to a special and independent rim) by suitable means which will permit of its tension being adjusted so as to retain the frames, plates, or strips in secure position on the tire.

In the drawings, to which reference will now be made, Figure 1 is a perspective view, partly in section, of one form or arrangement of a pneumatic tire (together with the wheel-rim) constructed according to the invention. Fig. 2 is a perspective view of one of the metal frames detached from its block, and Fig. 3 is a perspective view of a portion of a modified form of frame or plate.

The tire $a$ has its tread $a'$ formed with transverse gaps or recesses $b$, which thus divide it up into a number of blocks or protuberances $c$. On each of these blocks I fit or place a metal frame $d$ and connect said frames together by links $d'$ through the media of chains $d^2$, thereby forming a ring or chaplet of frames which operates to confine and support the said blocks or protuberances. These chains pass from one side of the tire to the other side thereof, and the portions extending between the blocks lie below the surface of the tread and in the gaps $b$. The frames $d$ preferably terminate in lateral curved flanges $d^3$, adapted to conform to the contour of the tread of the tire on which they bear and to take a firm seating thereon, thus minimizing friction and consequent heating between themselves and the tire.

$e$ is the chain mail, which is attached, by means of links $e'$, connected with some of the links of its outermost row, to the flanges $d^3$ on the frames $d$ and by some of the links of its innermost row to eyebolts $f$, set at suitable distances apart and provided with nuts $f'$. These bolts engage in lugs $g$, brazed to the wheel-rim $h$ or secured in like or other suitable manner to a special and independent rim. The chains $d^2$ are also attached to similar eyebolts $f^2$, passing through lugs $d^5$ on the rim of the wheel. The edges of the chain mail $e$ adjacent to each side of the chains $d^2$ may be looped or interlocked with these chains, as shown, or they may be free.

By manipulating the nuts $f''$ on the eyebolts $f f^2$ as may be required the chain mail $e$ and the chains $d^2$ can be adjusted or drawn taut, so keeping them secure against the tire, while at the same time maintaining the frames $d$ in firm position on the blocks or protuberances $c$.

The outer edges of the frames $d$ may lie flush with or project slightly above the blocks or protuberances $c$, and they may be serrated, as in Fig. 3, in order to obtain a firmer grip on the ground, and so provide additional security against skidding or side slip.

It will thus be readily understood that with a tire constructed according to this invention the rubber blocks or protuberances will in some cases act to prevent skidding or side slip, while in others the metal frames will so act, and, again, in others both the frames and the blocks or protuberances will act conjointly to prevent skidding or side slip. In addition to the above-mentioned purposes the improved arrangement provides for the wear of the tire to be taken up in part by the metal frames, thereby preserving the tread of the tire. Moreover, the chain mail or its equivalent by acting as a shield or protector prevents puncturing and cutting of the tire, and owing to its being tightly fastened down bursting of the tire is prevented, as is also its flying off the wheel, and, lastly, the resiliency of the tire is not interefered with, as is the case with the studded leather protectors now in use.

Although the drawings show metal frames applied to the blocks, yet it is obvious that I may employ metal plates, strips, or angle-irons and provide suitable means for connecting them together and for securing them to the blocks $c$.

Instead of forming the blocks as shown I may form them as triangles, polygons, ovals, or otherwise and make the frames to correspond therewith, and said frames may be wholly or partially closed. Furthermore, the blocks or protuberances may be formed on an independent band or strip of rubber or other appropriate material which could then be applied to and form the tread of the tire, the chains, frames, and chain mail acting to hold it securely to the tire. In other words, I construct a detachable tread, so that any injury which may be caused to the rubber from the presence of the metal will go no farther than the tread, and hence the life of the tire will be preserved.

The chains $d^2$ may be arranged to pass through holes in the tire-tread instead of lying in the gaps or grooves $b$ between the blocks &c.

The invention is applicable to solid as well as to pneumatic tires.

Having now described my invention, what I claim, and desire to secure by Letters Patent, is—

1. In a rubber tire the combination of a plurality of blocks on the tread, metal frames inclosing and supporting said blocks, chain mail, and means for connecting said mail to the frames and to the wheel.

2. In a rubber tire the combination of a plurality of blocks on the tread, means for inclosing and supporting said blocks, a chain connected to the frame-links and extending across the tire, and means for anchoring said chain to the wheel.

3. In a rubber tire the combination of a plurality of blocks on the tread and metal frames inclosing and supporting each of said blocks, said frames having lateral flanges with which chain mail is connected.

4. In a rubber tire, the combination of a plurality of blocks, metal frames inclosing and supporting said blocks links connecting the frames together, chains connected to said links, eyebolts secured to the ends of said chains, nuts on said eyebolts, and lugs secured to the wheel-rim and through which said bolts pass.

5. In a rubber tire the combination of a plurality of blocks on the tread portion thereof, metal frames confining and supporting each of said frames, chain mail connected to said frames, eyebolts secured to the free edges of the chain mail, nuts on said bolts, and lugs on the wheel-rim to receive said bolts.

6. In a rubber tire, the combination of a plurality of blocks on the tread portion thereof, metal frames confining and supporting each of said blocks, chains in connection with said frames, chain mail in connection with said chains, means for adjusting the tension on said chains, and means for adjusting the tension on said chain mail.

7. A rubber tire having its tread formed with a plurality of blocks, recesses between said blocks, metal frames to confine and support each of said blocks, links to connect said frames together, chains connected to said links, and lying for a portion of their length in said recesses, means for adjusting the tension of said chains, chain mail secured to said metal frames, and means for adjusting the tension of said chain mail, both said means being arranged on the wheel-rim.

In witness whereof I have hereunto signed my name in the presence of two subscribing witnesses.

ISIDOR CLIFFORD.

Witnesses:
COLIN A. BURTON,
H. D. JAMESON.